Oct. 30, 1951     D. M. BROOKS     2,573,180
GAS PRESSURE REGULATOR
Filed March 10, 1950
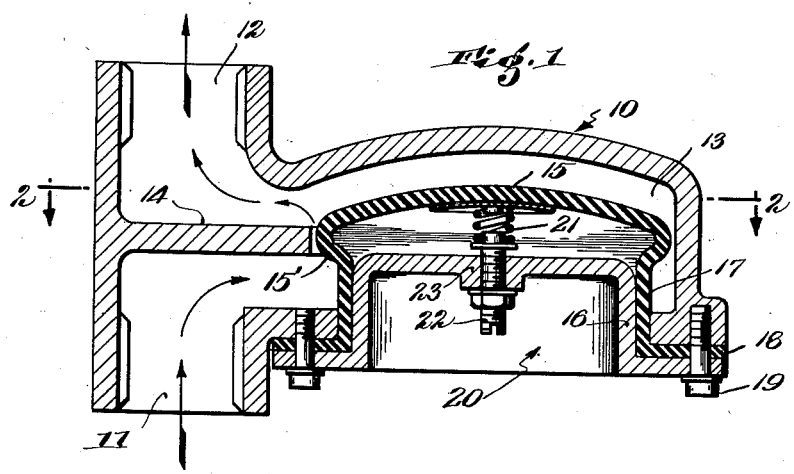
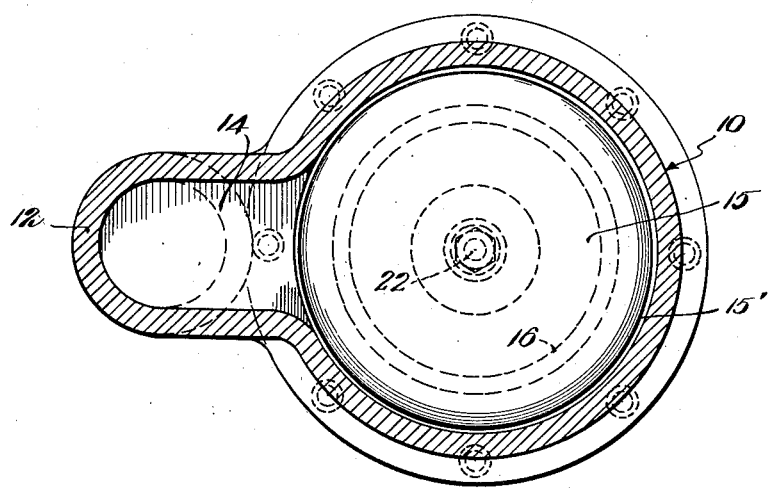

Patented Oct. 30, 1951

2,573,180

UNITED STATES PATENT OFFICE 2,573,180

GAS PRESSURE REGULATOR

Dexter M. Brooks, Plymouth, Mass.

Application March 10, 1950, Serial No. 148,902

3 Claims. (Cl. 50—23)

This invention relates to gas pressure regulators adapted to be disposed between inlet and outlet conduits and to maintain a predetermined gas pressure in the outlet conduit from gas received from the inlet conduit. The invention comprises an improved regulator having a concavo-convex flexible diaphragm arranged with its convex face exposed to the gas pressure of the outlet conduit and adapted to expand radially into contact with a cooperating seat when the diaphragm is collapsed by pressure toward the inlet conduit. The production of a relatively simple and sensitive regulator of this nature that is economical to produce comprises the primary object of the invention.

The diaphragm or valve is preferably made of rubber or like flexible and resilient material, cup-shaped and supported at its open end by means which also seals the diaphragm against the escape of gas from its interior. Functioning of commercial regulators heretofore known has required a breathing or venting to the atmosphere, whereas the pressure-responsive action of my improved regulator is so compensated for by the collapsing movement of the diaphragm that the need for such venting is eliminated. The production of an improved regulator embodying these novel features comprises a further object of the invention.

My improved regulator is substantially free of the friction and gravity inertia commonly found in commercial regulators and requires only a slight movement of the diaphragm to effect the desired pressure control. Means is also provided for adjusting the regulator to vary the regulated pressure in the outlet conduit.

These and other features of the invention will be best understood and appreciated from the following description of a preferred embodiment thereof, selected for purposes of illustration and shown in the accompanying drawings wherein, Fig. 1 is a longitudinal sectional view through inlet and outlet conduits of my improved regulator, and Fig. 2 is a sectional plan view taken on line 2—2 of Fig. 1.

The regulator herein shown includes in its organization a casing 10 to which leads a gas inlet conduit 11 and from which leads a gas outlet conduit 12. The casing 10 encloses a regulating chamber 13 into which projects an internal partition 14. This partition and the wall of casing are shaped to provide a circular opening for a valve of novel construction.

As illustrated in the drawing, the valve comprises a cup-shaped diaphragm of rubber or like resilient material having a closed top 15 of concavo-convex configuration. The diaphragm is supported on a closure member having a cylindrical upstanding portion 16 upon which is fitted the open downwardly-directed end or stem of the diaphragm. The top wall 15 of the diaphragm merges at its periphery through a looped section 15' into a cylindrical depending wall 17 that terminates in an out-turned flange 18. The wall of the circular opening through the partition 14 provides a circular valve seat for the diaphragm which is located with its looped peripheral section 15' opposed to the seat.

The convex face of the diaphragm is exposed to the gas pressure of the outlet conduit 12 and the base flange 18 of the diaphragm is disposed between a portion of the casing 10 and the base of a flanged closure cap 20 and gripped therebetween by bolts 19. The diaphragm is normally of a size to leave a slight annular gas passage between its looped section 15' and the surrounding valve seat. Collapsing of the diaphragm toward the inlet chamber is effective to expand the diaphragm radially into contact with the seat and thereby close the gas passage. The top wall 15 of the diaphragm may be additionally supported from beneath by a compression spring 21 mounted on the inner end of a bolt 22 threaded into and through the top wall 23 of the cap 20. Rotary adjustment of the bolt 22 is effective to vary the resistive action of the spring 21 on the top wall 15 of the diaphragm. It should be understood that under certain design conditions this supplementary support for the valve will not be needed and, under other design conditions, the supplemental support will be applied downwardly against the convex face of the valve.

The operation of my improved regulator is substantially as follows: The diaphragm normally assumes the position shown in Fig. 1 wherein gas can pass from the inlet conduit 11 to the outlet conduit 12 through the annular passage between the diaphragm and valve seat. When the pressure of gas in conduit 12 reaches the predetermined pressure for which the regulator is set to function, the gas pressure acting on the convex face of the top wall 15 collapses the diaphragm which thereupon expands radially outwardly into contact with the valve seat, thus closing the passage and cutting off the flow of gas.

On a 2½ inch diameter diaphragm at a pressure of 2½ inches water column, a total force of about one-half pound would prevail.

The distance of the movement of the periphery at right angles to this force would be about .05 inch in order to equal the flow of gas which would pass through a three-quarter inch pipe.

It is found that the displacement necessary to cause this right angle movement is adequately compensated for in the downward movement of the diaphragm, for this reason the chamber below the diaphragm may be completely sealed. No venting is necessary and should the diaphragm leak it would be sealed against escaping gas by the bottom cap.

The closing effort exerted is the ratio of the area of the circular top of the diaphragm to the small edge at the periphery of the diaphragm acting on the valve seat. This would be about six times, minus the small surface of the diaphragm exposed to the inlet pressure. These ratios are dependent on the design of the shape and thickness of the diaphragm and also of the bottom plate.

It is particularly to be noted that the radial expansion of the valve so compensates for the collapsing movement of the diaphragm toward the inlet conduit 11 that no venting of the valve is required. Thus the valve is sealed and no gas can escape therefrom. Contrary to this feature, commercial regulators are so constructed that a breathing or venting to the atmosphere is necessary to their function. This feature is a danger unless the vented gas is carried away by costly piping to a place of safety.

My regulator is also free from the friction of metal guides and practically free from gravity inertia commonly found in commercial regulators. In addition, this regulator requires only a slight movement of the diaphragm and is very sensitive in response and control of outlet pressure regardless of the variation of the inlet pressure.

Having thus disclosed my invention and described in detail an illustrative embodiment thereof, I claim as new and desire to secure by Letters Patent:

1. A gas pressure regulator comprising a casing having inlet and outlet conduits, a circular concavo-convex flexible diaphragm having a tubular depending stem, a closure cap detachably secured to the casing and having an upstanding cylindrical portion upon which is fitted the stem of the diaphragm thus supporting the diaphragm in the casing between said inlet and outlet conduits with the convex face of the diaphragm exposed to gas pressure of the outlet conduit, and means providing a circular valve seat radially outside of and adjacent to the peripheral margin of the diaphragm, collapsing of the diaphragm toward the inlet conduit being effective to expand the diaphragm into contact with said seat.

2. The gas pressure regulator defined in claim 1 in which the diaphragm is cup-shaped and includes a cylindrical portion and a peripheral portion of greater diameter integral with and connecting the cylindrical and concavo-convex portions, and a cylindrical member extending into the cylindrical portion and supporting the diaphragm.

3. A gas pressure regulator comprising a casing providing inlet and outlet chambers, an internal partition providing a circular valve seat, a cylindrical support located beneath the valve seat, and a resilient diaphragm having an upright tubular stem fitting upon said support, a convex top located above the valve seat and an intermediate looped section within the valve seat constructed and arranged to expand into sealing contact with the valve seat in response to gas pressure upon the convex top of the diaphragm.

DEXTER M. BROOKS.

REFERENCES CITED

The following references are of record in the file of this patent:

UNITED STATES PATENTS

| Number | Name | Date |
|---|---|---|
| 2,108,068 | Lang | Feb. 15, 1938 |
| 2,277,395 | Franck | Mar. 24, 1942 |
| 2,348,083 | McCabe | May 2, 1944 |
| 2,382,427 | Langdon | Aug. 14, 1945 |
| 2,427,441 | Butts | Sept. 16, 1947 |